United States Patent [19]

Mendelsohn et al.

[11] 4,107,107

[45] Aug. 15, 1978

[54] PROCESS FOR THE MANUFACTURE OF A FLAME RESISTANT, INSULATING, ENERGY-ABSORBING, POROUS PHENOLIC FOAM

[75] Inventors: Morris A. Mendelsohn, Wilkins Township, Allegheny County, Pa.; Girard B. Rosenblatt, Jr., Los Altos, Calif.; Joseph F. Meier, Export, Pa.

[73] Assignee: Westinghouse Electric Corp., Pittsburgh, Pa.

[21] Appl. No.: 696,609

[22] Filed: Jun. 16, 1976

[51] Int. Cl.$^2$ .................................................. C08J 9/14
[52] U.S. Cl. .......................................... 521/106; 89/5; 264/45.8; 521/116; 521/181
[58] Field of Search ........................... 260/2.5 F; 89/5; 264/45.8

[56] References Cited

U.S. PATENT DOCUMENTS

| | | | |
|---|---|---|---|
| 3,389,094 | 6/1968 | D'Alessandro | 260/51 EP |
| 3,639,303 | 2/1972 | Penfold | 260/2.5 F |
| 3,766,100 | 10/1973 | Meyer-Stoll et al. | 260/2.5 F |
| 3,865,757 | 2/1975 | Wade | 260/2.5 F |
| 3,870,661 | 3/1975 | Crook et al. | 260/2.5 F |
| 3,872,033 | 3/1975 | Boden et al. | 260/2.5 F |
| 3,885,010 | 5/1975 | Bruning et al. | 260/2.5 F |
| 3,998,765 | 12/1976 | Novak et al. | 260/2.5 F |

*Primary Examiner*—M. J. Welsh
*Attorney, Agent, or Firm*—D. P. Cillo

[57] ABSTRACT

A high compressive strength phenolic resin foam is made by: adding between about 0.5 to 5.0 parts of a dual surfactant system and about 8 to 25 parts of a blowing agent, to 200 parts of a phenolic resole resin to form a pre-mix; agitating this pre-mix with about 20 to 70 parts of an aqueous dual sulfuric-phosphoric acid solution to provide a foaming phenolic material; immediately thereafter pouring or injecting the material into a mold or onto a suitable substrate, to provide a phenolic foam having a substantially uniform compressive strength of at least 40 psi. at between about 20% to 50% compression, at a deflection rate of between about 2 in./min. to about 5 in./min.

13 Claims, 4 Drawing Figures

PROCESS FOR THE MANUFACTURE OF A FLAME RESISTANT, INSULATING, ENERGY-ABSORBING, POROUS PHENOLIC FOAM

This invention herein described was made in the course of or under a contract or subcontract thereunder with the Department of the Navy.

BACKGROUND OF THE INVENTION

Flexible polyurethane foam can be made to have flame resistant, insulating, and energy-absorbing properties. It has had a wide variety of end uses, ranging from a structural building material to a shock-mitigating material in the closure of submarine missile launch systems. Polyurethane structural foams are expensive however, and require addition of flame retardants to make them fire resistant. Also, polyurethane foam has not met all the breathability and load-deflection response requirements necessary to accelerate the closure shell in a missile launch system to launch velocity, without damaging the missile nose during launch.

Phenolic resin foams have been taught by D'Alessandro, in U.S. Pat. No. 3,389,094. There, an extremely small closed cell, abrasion resistant, water resistant, flame resistant foam, with trapped blowing agent, was produced. D'Alessandro combined specific polyhalogenated saturated fluorocarbon blowing agents, with a phenolic resole resin, a nonionic surfactant and a strong acid catalytic condensation agent. Penfold, in U.S. Pat. No. 3,639,303, taught use of both mononuclear phenols and polynuclear diphenols, to provide phenolic resole resins which were reacted at about 50° C to 60° C, with a low boiling hydrocarbon or fluorocarbon blowing agent, a nonionic surfactant and a mineral acid catalytic condensation agent. This provided a foam with good toughness, abrasion resistance and thermal insulation properties, useful in structural applications such as roof decks. None of these patents, however, provide a method of controlling phenolic resole foam compressive strength and breathability, to provide foams having a variety of properties and end uses, and having not only flame resistant, insulating and abrasion resistant properties, but also high compressive strength properties.

SUMMARY OF THE INVENTION

A rigid, flame resistant, phenolic foam, having a wide range of insulating and compressive strength properties, which can be used as roof decking material, or as the energy-absorbing, shock-mitigating material employed in the closure of a submarine missile launch system, is made by: (1) adding together, preferably at a materials temperature of up to about 24° C, 200 parts by weight of at least one liquid phenolic resole resin having a viscosity at 25° C of between about 100 cps. to about 30,000 cps., about 0.5 to about 5.0 parts of a nonionic lipophilic-hydrophilic surfactant mixture, and about 8 to about 25 parts of a fluorocarbon blowing agent; and mixing the ingredients, preferably at a temperature of between about 10° C and about 25° C, for a time effective to form a homogeneous pre-mix, and then (2) adding, preferably at a materials temperature of between about 10° C to about 25° C, about 20 to about 70 parts of an acid solution containing a sulfuric-phosphoric acid solution admixture; and high speed, high shear agitating or mixing, preferably at a temperature of between about 10° C and about 25° C, over a time period of preferably between about 0.5 second to about 18 seconds, to provide a foaming phenolic material, immediately thereafter, (3) pouring, injecting or otherwise placing the foaming phenolic material into a suitable hollow or flat containing means, such as a mold or on a substrate; and allowing it to cream, rise and solidify, to provide a rigid, phenolic foam bun, (4) optionally trimming the bun, (5) optionally heating the trimmed rigid foam bun for a time and at a temperature effective to remove volatile products from the foam, and (6) cutting the trimmed foam to the desired shape, and (7) optionally neutralizing it with a gaseous base.

This process requires both a dual surfactant and a dual acid system, and produces a rigid phenolic foam having a density of between about 5 to about 10 lb./cu. ft., and a substantially uniform compressive strength of at least 40 psi., preferably between about 40 psi. to about 150 psi., at between about 20% to about 50% compression, when compressed at a deflection rate of between about 2 in./min. to about 5 in./min. The compressive strength cell structure and insulating properties may be varied by adjusting the amount of dual surfactant, dual acid solution and blowing agent used in the formulation. This method can thus provide foams having a variety of properties and end uses. This phenolic foam, in one embodiment, permits air to flow freely through its interior cells, and in another embodiment has closed cells and superior insulating properties.

This method produces a rigid phenolic foam meeting all the requirements of specific load-deflection response on crushing, for shock mitigating material in missile launch closure systems. The foam produced, when neutralized, has good non-corrosive characteristics. The foam is also useful as a flame resistant billet or slab structural and insulation material, having a wide variety of applications in the building industry. It can be used, for example, as high-compressive strength, non-flammable, insulating roof decking that can be walked on without cracking or deformation, slabstock foam, which can be laminated to and covered by outer panels, to form insulating structural wall material for use as fire proof insulating partitions, and thermal insulation for piping.

BRIEF DESCRIPTION OF THE DRAWINGS

For a better understanding of the invention, reference may be made to the exemplary embodiments shown in the accompanying drawings in which.

DESCRIPTION OF THE PREFERRED EMBODIMENTS

Figure 1:
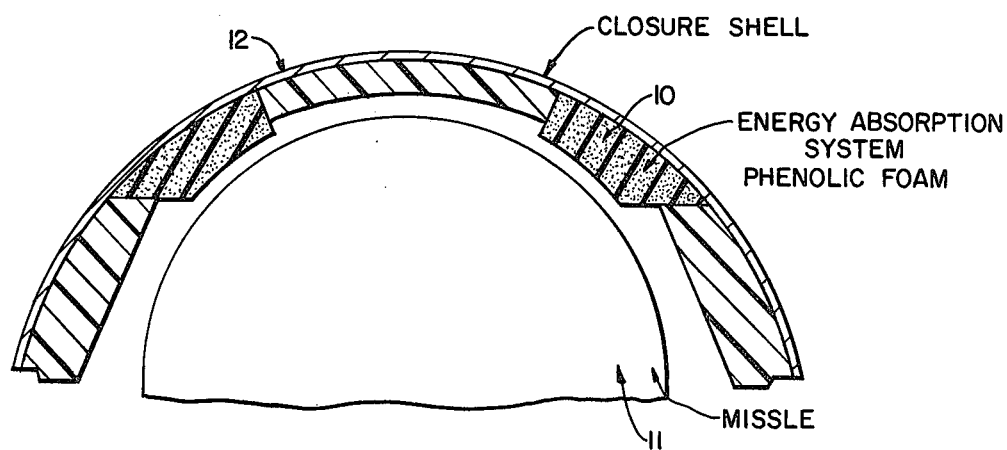
FIG. 1 shows a submarine closure, with one embodiment of the energy-absorption system phenolic foam of this invention disposed between the closure shell and the missile nose.

Referring now to FIG. 1, a rigid phenolic foam 10 is shown, in one of its embodiments, as a material attached to the closure shell of a missile launch tube. During launch, the foam 10, located between the missile nose 11 and the closure shell 12, accelerates, opening of the closure shell, while absorbing energy as it is crushed by the missile. In order that the maximum allowable axial load and pressure on the missile nose not be exceeded as the missile is breaking through the closure shell during launch, the phenolic foam must be made to have certain compressive stress-strain and gas permeability characteristics.

Figure 2:
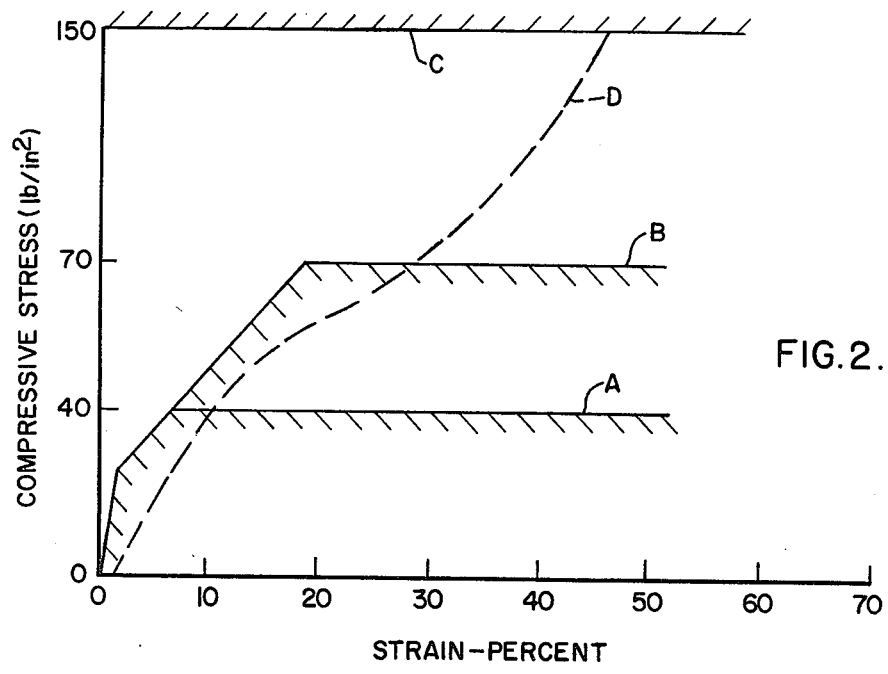
FIG. 2 shows stress-strain curves for the foam of this invention.

Useful phenolic resole foams can be made to conform to the compression-deflection characteristics within curves (A) (B) and (C) of FIG. 2. As can be seen from FIG. 2, the foam has a substantially uniform, flat stress plateau after about 20% compression. Essentially constant stress up to the ultimate strain provides desired properties of high energy absorption (area under the load compression curve) while preventing the attainment of high stresses.

Flexible foams provide a relatively constant increase in stress with strain, as shown by dotted curve (D) in FIG. 2. Rigid foams, described herein, were found to have the substantially uniform, flat stress plateau properties shown, for example, in FIG. 2, as curve (B) if made by a carefully controlled process using critical ratios of specific ingredients and carefully controlled process variables.

In accordance with the method of this invention, a rigid phenolic foam is made by: (1) adding together, preferably at a materials temperature of up to about 24° C, 200 parts by weight of at least one phenolic resole resin. The phenolic resin may comprise a mixture of a one-step, heat reactive, high viscosity liquid phenolic resole resin, having a viscosity of between about 1,550 cps. to about 30,000 cps. at 25° C, and a one-step, heat reactive, low viscosity liquid phenolic resole resin diluent, having a viscosity of between about 100 cps. to about 1,500 cps. at 25° C, where the weight ratio of high viscosity phenolic resin:low viscosity phenolic resin is from 1:0 to 5:1; about 0.5 to about 5.0 parts of a dual nonionic surfactant system, containing a nonionic lipophilic surfactant and a nonionic hydrophilic surfactant combination, where the weight ratio of nonionic lipophilic surfactant:nonionic hydrophilic surfactant is from about 10:1 to about 0.6:1; and about 8 to about 25 parts of a fluorocarbon blowing agent; and agitating, generally by mixing, preferably at a temperature of between about 10° C and about 25° C for a time effective to form a homogeneous pre-mix, usually over a time period of between about 10 seconds to about 300 seconds, and then, (2) adding, preferably at a materials temperature of between about 10° C to about 25° C, about 20 to about 70 parts of a dual aqueous acid catalyst solution, preferably prepared from about 35% to about 65% concentration sulfuric acid: about 65% to about 90% concentration phosphoric acid, where the weight ratio of 35%–65% sulfuric acid: 65%–90% phosphoric acid is from about 10:1 to about 0.8:1; and high speed high shear agitating or mixing, using a suitable mixing or agitating means, such as a motor driven blade mixer, pump driven high velocity baffle mixer, etc., preferably at a temperature of between about 10° C and about 25° C over a time period of preferably between about 0.5 second to about 18 seconds, to provide a catalyzed, foaming phenolic material; immediately thereafter, (3) pouring or injecting the foaming phenolic material into a container such as a mold, or on a suitable substrate such as a flat moving conveyor belt having raised sides to contain the rising foam, or into movable molds on a driven conveyor belt; and allowing the material to cream, rise, expand and solidify, to provide a rigid, porous phenolic foam bun, (4) optionally trimming the crown of the bun and preferably at least ¼ inch of the skin from the rigid foam, (5) optionally heating the trimmed rigid foam bun for a time and a temperature effective to remove volatile products from the foam, usually for between about 3 hours to 24 hours at between about 60° C to about 120° C, (6) cutting the trimmed foam to the desired shape and (7) optionally neutralizing it with a basic material, preferably a gas such as gaseous ammonia.

The specific ranges of specific materials and specific combinations of materials described hereinabove must be used in the method of this invention to produce a rigid foam having excellent uniformity, and the desired compression and breathability for use either as an energy absorption foam or as an insulating building material. This method produces a rigid phenolic foam having a substantially uniform compressive strength of between about 40 psi. to about 150 psi. at between about 20% to about 50% compression, when compressed at a deflection rate of between about 2 in./min. to about 5 in./min., i.e. above curve (A) of FIG. 2.

This phenolic energy absorption foam can have a wide range of cell structure. It can be made very porous, having a skeletal matrix that permits air to flow freely through its interior cells, so that a pressure differential of between about 5 mm. to 40 mm. of Hg is obtained at an air flow rate of about 16 std. cu. ft./min. (SCFM) at 25° C. It can also be made to have a relatively closed skeletal matrix, so that a pressure differential of between about 45 mm. to 200 mm. of Hg is obtained, at an air flow rate of about 16 std. cu. ft./mm. at 25° C, making it an excellent insulator.

Within the broad ranges of materials described hereinabove, two preferred embodiments of this phenolic foam can be made by the method of this invention. An embodiment specific to the foam having excellent breathability and moderate compression, i.e., about 5 to 40 mm. Hg and about 40 to 70 psi. as described above, used for example as an energy absorbing foam in missile closure systems, can comprise an admixture of: 200 parts of a dual phenolic resin system described immediately hereinafter; about 0.5 to about 1.0 part of the dual surfactant mix described above; about 12 to about 25 parts of a fluorocarbon blowing agent and about 20 to about 40 parts of the dual acid solution described above, where sulfuric acid content is up to about 25 parts.

An embodiment specific to foam having excellent insulation and high compression, i.e., about 40 to 100 mm. Hg and about 70 to 150 psi. as described above, used for example as an insulating roofing material, can comprise an admixture of: 200 parts of a resin system containing at least one phenolic resin as described immediately hereinafter; about 0.75 to about 5 parts of the dual surfactant mix described above; about 8 to about 13 parts of a fluorocarbon blowing agent and about 40 to about 70 parts of the dual acid solution described above, where sulfuric acid content is over about 25 parts. Additional water, up to about 15 parts, can also be used.

A dual phenolic resin system is required in the foam embodiment between curves (A) and (B) of FIG. 2, for use in submarine missile launch systems, in order to get a good balance between compressive strength and foam permeability. In this instance the weight ratio of high viscosity phenolic resin:low viscosity resin described above is between about 20:1 to about 5:1. For purely insulation and structural material embodiments, generally between curves (B) and (C) of FIG. 2, a single phenolic resin can be used having a viscosity of between about 1,550 cps. to about 30,000 cps.

The phenolic resins are generally stored under refrigeration, at about −1° C to 8° C since their viscosity increases when stored at room temperature. Resin stored under refrigeration should be mixed prior to use as some settling occurs during storage. Phenolic resols are used in this invention. Phenolic resole resins are well known in the art and reference may be made to *Plastics Materials* by J. A. Brydson, 1966, Ch. 19, herein incorporated by reference, for details on their preparation.

Phenolic resole resins are the condensation reaction products of monohydric phenol and an aldehyde. Preferred are the resins made from phenol and formaldehyde, although other phenols such as meta cresol, meta xylenol and the like can also be employed, as can mixtures of phenol and ortho cresol. Similarly, the formaldehyde can be replaced by other aldehydes or aldehyde liberating compounds such as para-formaldehyde, formalin and the like. The liquid resole resins are the alkaline-catalyzed condensates which are carried to only a mild state of resinification so that they are normally liquid or low melting solids and generally water soluble. This is known as the "A" state of resinification, the "C" state being the fully cured thermoset resin stage. Typical foamable resole compositions employed in this invention are those having an initial viscosity between about 100 cps. to 30,000 cps. but preferably between about 100 cps. to about 20,000 cps. at 25° C. The resins may contain minor amounts of water.

Both a high viscosity, phenolic resin: about 1,550 cps. to 30,000 cps. at 25° C with a solids content of between about 70% to about 85%; and a low viscosity, diluent phenolic resin: about 100 cps. to about 1,500 cps. at 25° C with a solids content of between about 51% to 70%, can be used in this invention. The ratio of high viscosity phenolic resin:low viscosity phenolic resin is from about 1:0 to about 5:1. That is, an all high viscosity system can be used. Both phenolic resins are one-step, heat reactive liquids having a pH of between about 5.8 and 7.0. As low viscosity phenolic resin concentration is increased the rate of reaction increases, permeability of the foam increases and load bearing of the foam decreases.

About 0.5 to about 5.0 parts by weight of a dual surfactant system is added to the phenolic resin. While the surfactant system has no discernible effect on the rate of reaction, it strongly influences the air permeability and compression-deflection characteristics of the phenolic foam matrix. The surfactant system contains a nonionic lipophilic surfactant and a nonionic hydrophilic surfactant combination, where the ratio of nonionic lipophilic surfactant: nonionic hydrophilic surfactant is from about 10:1 to about 0.6:1. The use of a dual surfactant system is critical to the process of this invention.

The nonionic hydrophilic surfactant has a viscosity of about 300 cps. to about 1,000 cps. at 25° C, is soluble in water and has a hydrophile-lipophile balance (HLB) rating of about 13 to 16. The nonionic lipophilic surfactant has a viscosity of about 600 cps. to about 1,500 cps. at 25° C, is dispersible in water and has a hydrophile-lipophile balance rating of about 3 to 6. Higher HLB numbers indicate greater hydrophilic (water attracting) character. Lipophilic surfactants are generally considered those having HLB numbers below 9.0 whereas ones that are hydrophilic are given numbers above about 11.0. The HLB system is well known in the art and thoroughly described by G. Greth and J. Wilson in *J. Applied Polymer Science*, Vol. 5, pp. 135–148 (1961), herein incorporated by reference.

The nonionic lipophilic surfactant is used to assure mixing of the components used in making the foam through its ability to promote a water in oil emulsion (couple water soluble materials in the oil phase). It increases permeability and provides an open cell structure. The nonionic hydrophilic surfactant is required to assure mixing of the components used in making the foam, acting as an emulsifier, thus stabilizing the system through its ability to provide oil in water phase emulsions. It provides a dense structure with a closed cell structure and high compressive strength. Thus the use of these two ingredients balance each other and provide the preferred surfactant system. The most preferred nonionic hydrophilic surfactant is polyoxyethylene sorbitan monostearate, having about 15 to 20 repeating oxyethylene units, which is also an emulsifier. The most preferred nonionic lipophilic surfactant is sorbitan monooleate.

This preferred mixture of surfactants is added to the mixture of phenolic resins, all the materials preferably being within a temperature range of between about −1° C to about 24° C. The materials are stirred, usually using a mixer, for about 2 to 7 minutes, until the temperature of the resin admixture is preferably between about 10° C to about 25° C. Stirring is then continued, preferably at about 1,000 rpm. to about 1,500 rpm., for preferably about 10 seconds to about 180 seconds, to assure a completely homogeneous resin mix.

A suitable blowing agent is added to the resin admixture. The materials are stirred, usually using a mixer, at about 1,000 rpm. to about 1,500 rpm. Within this mixing speed a homogeneous pre-mix is produced without undue evaporation losses of the blowing agent. Suitable blowing agents are well known in the art and include, for example, fluorinated aliphatic saturated hydrocarbons, such as methylene chloride, monofluorotrichloromethane, dichlorodifluoromethane, trichloromonofluoromethane, 1,2-difluorotetrachloroethane, 1,1,2-trichloro-1,2,2-trifluoroethane and 1,2-dibromotetrafluoroethane among others. Preferably the blowing agent will have an atmospheric boiling point of between about −40° C to about 130° C. Use of over about 25 parts blowing agent per 200 parts resin will reduce the compressive strength of the foam. Below about 8 parts blowing agent will make the foam heavy and overly dense.

An aqueous sulfuric-phosphoric acid solution is added to the resin pre-mix admixture after blowing agent addition. The materials are agitated, using a high speed high sheer mixing means, preferably at about 1,600 rpm. to about 2,500 rpm. to insure complete mixing in a short time period, or using other agitating means such as a pump driven high velocity baffle mixer. In this method, the mixing must be completed before about 20 seconds have elapsed for the foam to rise properly. If the acid is added before the blowing agent, then the acid will start reacting with the resin causing premature phenolic resin crosslinking. If highly concentrated sulfuric acid is used, too rapid a reaction will result.

This combination of dual acids provides a critical balance between foam rise time, heat generation to activate the blowing agent, and rate of polymerization and crosslinking of the phenolic resin. Over about 70 parts acid solution per 200 parts resin causes excessive reaction in the process and results in a too high density foam. Less than about 20 parts results in inadequate load bearing and a non-uniform foam. Phosphoric acid is essential, and appears to have the effect of reducing the interfacial surface energy of the components of the foaming system and also adds significantly to flame retardation properties.

Excessively slow rates of reaction are to be avoided, as this permits separation of the mixed ingredients prior to the reaction with the result that the foam does not possess uniform properties throughout the bun. Water was used to dilute the sulfuric acid. Since water dilutes the catalyst and reactants and absorbs heat from the exothermic foaming reaction, the rate of reaction decreases with increasing water content. Additional water increases density and compressive strength while decreasing breathability somewhat and lengthening the rise time. However, up to about 15 parts of water per 200 parts resin can be added to the acid solutions described hereinabove, to further dilute them, or to the phenolic resin, to increase rise time, compressive strength and density and make an insulating material with small pores. Since water dilutes the catalyst and reactants and absorbs heat from the exothermic reaction, the rate of reaction decreases with increasing water content.

EXAMPLE 1

A series of foam formulations were made having the compositions set forth in Table 1 in parts by weight:

hydrophile-lipophile balance rating of 4.3. This component is dispersible in water, has an acid number of 8.0 and a hydroxyl number of 193 to 210 (sold commercially by Atlas Chemical Co. under the trade name Span 80) and polyoxyethylene sorbitan monostearate, liquid nonionic hydrophilic surfactant emulsifier, having a viscosity at 25° C of 600 cps. and a hydrolphile-lipophile balance rating of 14.9. This component is soluble in water, has an acid number of 2.0 and a hydroxyl number of 81 to 96 (sold commercially by Atlas Chemical Co. under the trade name Tween 60). In sample 11, the resin component consisted solely of 200 parts of the high viscosity Bakelite BRL-2760. In sample 12, nine parts of water was added to the phenolic resins. These ingredients were mixed in the ratio indicated in TABLE 1 in a tared 20 gallon galvanized steel container.

The phenolic resins were stored at between about −1° C to 8° C. After addition of the dual surfactant system the admixture was warmed and homogeneously mixed by stirring it for about 5 minutes at about 1,350 rpm. with a high shear design impeller driven Cowles model 515-HV mixer having a 10 inch blade. At this point the admixture was at a temperature of between 15° C to 24° C as indicated in TABLE 1. The weight ratio of high viscosity phenolic:low viscosity phenolic was 9:1 and the ratio of lipophilic surfactant:hydro-

TABLE 1

| Sample | Re-action Temp. ° C | Composition (Parts by Weight) | | | | | | |
|---|---|---|---|---|---|---|---|---|
| | | Phenolic Resin | | Span 80 Lipophilic | Tween 60 Hydrophilic | Blowing Agent | $H_2SO_4$ (47–48%) | $H_3PO_4$ (85%) |
| | | High Viscosity | Low Viscosity | Surfactant | | | | |
| 1 | 24 | 180 | 20 | 0.5 | 0.25 | 12 | 25 | 15 |
| 2 | 24 | 180 | 20 | 0.5 | 0.25 | 15 | 25 | 15 |
| 3 | 24 | 180 | 20 | 0.5 | 0.25 | 10 | 20 | 15 |
| 4 | 18 | 180 | 20 | 0.5 | 0.25 | 12 | 25 | 30 |
| 5 | 18 | 180 | 20 | 1.5 | 0.25 | 12 | 25 | 15 |
| 6 | 18 | 180 | 20 | 0.5 | 0.75 | 12 | 25 | 15 |
| 7 | 18 | 180 | 20 | 2.0 | 1.00 | 12 | 25 | 15 |
| 8 | 21 | 180 | 20 | 1.0 | 0.20 | 17 | 25 | 15 |
| 9 | 18 | 180 | 20 | 0.5 | 0.25 | 12 | 35 | 15 |
| 10 | 15 | 180 | 20 | 0.5 | 0.25 | 13 | 25 | 15 |
| 11 | 18 | 200 | 0 | 0.5 | 0.25 | 12 | 25 | 15 |
| 12* | 18 | 180 | 20 | 0.5 | 0.25 | 12 | 25 | 15 |

| Sample | Compression - Deflection Characteristics Stress lb./sq. in. at % Deflection | | | | Density lb./cu.ft. | Permeability Press. Diff. mm. Hg. at 16 std. cu. ft./min. (SCFM) |
|---|---|---|---|---|---|---|
| | 20% | 30% | 40% | 50% | | |
| 1 | 74.3 | 73.2 | 71.2 | 69.4 | 6.4 | 29 |
| 2 | 52.4 | 53.2 | 52.1 | 50.9 | 5.7 | 29 |
| 3 | 68.7 | 67.5 | 66.9 | 65.3 | 6.2 | 19 |
| 4 | 72.9 | 71.9 | 70.5 | 69.6 | 6.5 | 27 |
| 5 | 70.9 | 69.8 | 67.4 | 65.0 | 6.9 | 14 |
| 6 | 57.0 | 56.4 | 56.2 | 55.5 | 7.5 | 21 |
| 7 | 80.2 | 79.7 | 78.3 | 76.3 | 5.9 | 13 |
| 8 | 60.9 | 61.4 | 60.7 | 60.3 | 5.7 | 10 |
| 9 | 105.8 | 105.1 | 105.0 | 103.4 | 7.5 | 45 |
| 10 | 107.0 | 105.5 | 105.0 | 104.0 | 7.2 | 87 |
| 11 | 81.9 | 80.2 | 78.8 | 74.1 | 6.6 | 40 |
| 12* | 113.9 | 113.2 | 110.3 | 107.8 | 8.3 | 168 |

*9 parts $H_2O$ added to the resin.

In samples 1 to 10 and 12 a phenolic resin admixture was made by mixing 180 parts by weight of a one-step, heat-reactive, high viscosity, liquid phenolic resin, having a viscosity at 25° C of 2,350 cps. to 3,125 cps., a solids content of 78% to 81% and a pH of 6.0 to 6.8 (sold commercially by Union Carbide Corp. under the trade name Bakelite BRL-2760), 20 parts by weight of a one-step, heat reactive, low viscosity, liquid phenolic resin, having a viscosity at 25° C of 400 cps. to 800 cps., a solids content of 61% to 63% and a pH of 6.0–6.3 (sold commercially by Union Carbide Corp. under the trade name Bakelite BRL-2759) and between 0.75 and 1.75 parts by weight of a dual surfacant system consisting of: sorbitan monooleate, liquid nonionic lipophilic surfactant, having a viscosity at 25° C of 1,000 cps. and a philic surfactant was between 6.0:1 to 0.67:1.

A non-flammable blowing agent, 1,1,2-trichloro-1,2,2-trifluoroethane ($CClF_2.CCl_2F$) having a boiling point of 47.6° C at 1 atmosphere pressure and a viscosity at 21° C of 0.69 cps. (sold commercially by Union Carbide under the trade name Niax 113 and by DuPont Chemical Co. under the trade name Freon 113) was added, so that 10 to 17 parts by weight was incorporated into the phenolic resin admixture taking into account losses due to splashing and evaporation. The blowing agent was added at a temperature of about 25° C, about 60 seconds after the dual phenolic, dual surfactant admixture had reached 15° C to 24° C. This combination of ingredients was then mixed at 1,350 rpm. for Sample 24, which was mixed for 20 seconds. The same pouring and testing procedure was followed as in EXAMPLE 1, with the results given in TABLE 2 above.

As can be seen using only 15 parts $H_2SO_4$ and allowing only 20 seconds to expire during mixing the acid catalyst as in Sample 24 provided a low compressive strength foam. The use of only a hydrophilic surfactant, as in Sample 21, the use of only a lipophilic surfactant, as in Sample 22, or the use of only 0.37 parts surfactant, as in Sample 23, produced a low compressive strength foam or collapse. Use of only sulfuric acid as in Sample 20 produced a low compressive strength foam. When a dual phenolic system is used a weight ratio of high viscosity phenolic:low viscosity phenolic of 2.3:1 and 4:1 produced poor foams.

We claim:

1. A method of making a rigid, high compressive strength phenolic resin foam, comprising the steps of:
   (A) forming a premix by mixing:
      (1) 200 parts by weight of at least one liquid phenolic resole resin comprising a mixture of a high viscosity phenolic resin having a viscosity at 25° C of between about 1,550 cps. to about 30,000 cps. and a low viscosity phenolic resin having a viscosity at 25° C of between about 100 cps. to about 1,500 cps., wherein the weight ratio of high viscosity phenolic resin:low viscosity phenolic resin is from about 1:0 to about 5:1,
      (2) about 0.5 parts to about 5 parts by weight of a dual surfactant mixture consisting of a lipophilic surfactant and a hydrophilic surfactant, and
      (3) about 8 parts to about 25 parts by weight of a fluorocarbon blowing agent to form a pre-mix, and then
   (B) adding to the pre-mix about 20 parts to about 70 parts by weight of a dual acid catalyst solution comprising a sulfuric acid and phosphoric acid solution, and agitating the admixture, and then,
   (C) placing the catalyzed admixture into a containing means and allowing it to solidify, to provide a rigid phenolic foam having a substantially uniform compressive strength of at least 40 psi. at between about 20% to about 50% compression, when compressed at a deflection rate of between about 2 in./min. to about 5 in./min.

2. The method of claim 1, wherein the weight ratio of lipophilic surfactant:hydrophilic surfactant is from about 10:1 to about 0.6:1, the lipophilic surfactant has a hydrophile-lipophile balance rating of between about 3 to 6 and the hydrophilic surfactant has a hydrophile-lipophile balance rating of between about 13 to 16.

3. The method of claim 2, wherein the acid catalyst solution comprises a sulfuric acid and phosphoric acid solution, wherein the weight ratio of sulfuric acid:phosphoric acid is from about 10:1 to about 0.8:1 and the ingredients are mixed in step (B) at a temperature of between about 10° C to about 25° C for between about 0.5 seconds to about 18 seconds.

4. The method of claim 3, werein after step (C) the foam is heated at a temperature effective to remove volatile products from the foam.

5. The method of claim 3, where, in step (C) the containing means is a movable mold on a driven belt.

6. The method of claim 3, wherein the lipophilic surfactant is sorbitan monooleate, the hydrophilic surfactant is polyoxyethylene sorbitan monostearate, and the blowing agent has a boiling point of between about −40° C to about 130°.

7. The method of claim 3, wherein the mixing in step (A) is by a mixer at over about 1,000 rpm. the agitating in step (B) is by a mixer at between about 1,600 rpm. to about 2,500 rpm. and as a last step the foam is neutralized with a gaseous base.

8. A method of making a rigid, flame resistant, porous, energy absorbing phenolic resin foam, comprising the steps of:
   (A) forming a premix by mixing:
      (1) 200 parts by weight of a mixture comprising a high viscosity phenolic resole resin having a viscosity at 25° C of between about 1,550 cps. to about 30,000 cps. and a low viscosity phenolic resin having a viscosity at 25° C of between about 100 cps. to about 1,500 cps., wherein the weight ratio of high viscosity phenolic resin:low viscosity phenolic resin is from about 20:1 to about 5:1,
      (2) about 0.5 parts to about 1 part by weight of a dual surfactant mixture consisting of a lipophilic surfactant and a hydrophilic surfactant, wherein the weight ratio of lipophilic surfactant:hydrophilic surfactant is from about 10:1 to about 0.6:1, and
      (3) about 12 parts to about 25 parts by weight of a fluorocarbon blowing agent to form a pre-mix, and then
   (B) adding to the pre-mix about 20 parts to about 40 parts by weight of a dual acid catalyst solution comprising sulfuric acid and phosphoric acid solution, and high speed high sheer agitating the admixture, and immediately thereafter,
   (C) placing the catalyzed admixture into a containing means, and allowing it to solidify, to provide a rigid, porous, phenolic foam having a substantially uniform compressive strength of between about 40 psi. to about 70 psi. at between about 20% to about 50% compression, when compressed at a deflection rate of between about 2 in./min. to about 5 in./min.

9. A method of making a rigid, flame resistant, insulating, high compressive strength foam, comprising the steps of:
   (A) forming a premix by mixing:
      (1) 200 parts by weight of a mixture comprising a high viscosity phenolic resole resin having a viscosity at 25° C of between about 1,550 cps. to about 30,000 cps. and a low viscosity phenolic resin having a viscosity at 25° C of between about 100 cps. to about 1,500 cps. wherein the weight ratio of high viscosity phenolic resin:low viscosity phenolic resin is from 1:0 to about 5:1,
      (2) about 0.75 parts to about 5 parts by weight of a dual surfactant mixture consisting of a lipophilic surfactant and a hydrophilic surfactant, wherein the weight ratio of lipophilic surfactant:hydrophilic surfactant is from about 10:1 to about 0.6:1, and
      (3) about 8 parts to about 13 parts by weight of a fluorocarbon blowing agent to form a pre-mix and then
   (B) adding to the pre-mix about 40 parts to about 70 parts by weight of a dual acid catalyst solution comprising sulfuric acid and phosphoric acid solution, and high speed high sheer agitating the admixture, and immediately thereafter,
   (C) placing the catalyzed admixture into a containing means, and allowing it to solidify, to provide a an additional 50 seconds, after which, the stirring speed was increased to 1,750 rpm. during acid addition.

Sulfuric acid ($H_2SO_4$) at a concentration of 95.5% to 96.5%, having a specific gravity of 1.84 was diluted to 47% to 48% acid by pouring the concentrated acid into ice. Phosphoric acid ($H_3PO_4$) at 85% concentration, having a specific gravity of 1.69 was added directly to the diluted sulfuric acid in the ratio indicated in TABLE 1. The amount of dual acid catalyst solution added was between 35 to 55 parts and the weight ratio of (47–48%) sulfuric acid: (85%) phosphoric acid was between 2.33:1 to 0.83:1. The dual acid solution was added and mixed with the 20 gallon container at a temperature of about 15° C to 24° C to cause creaming and foaming of the ingredients.

Figure 3:
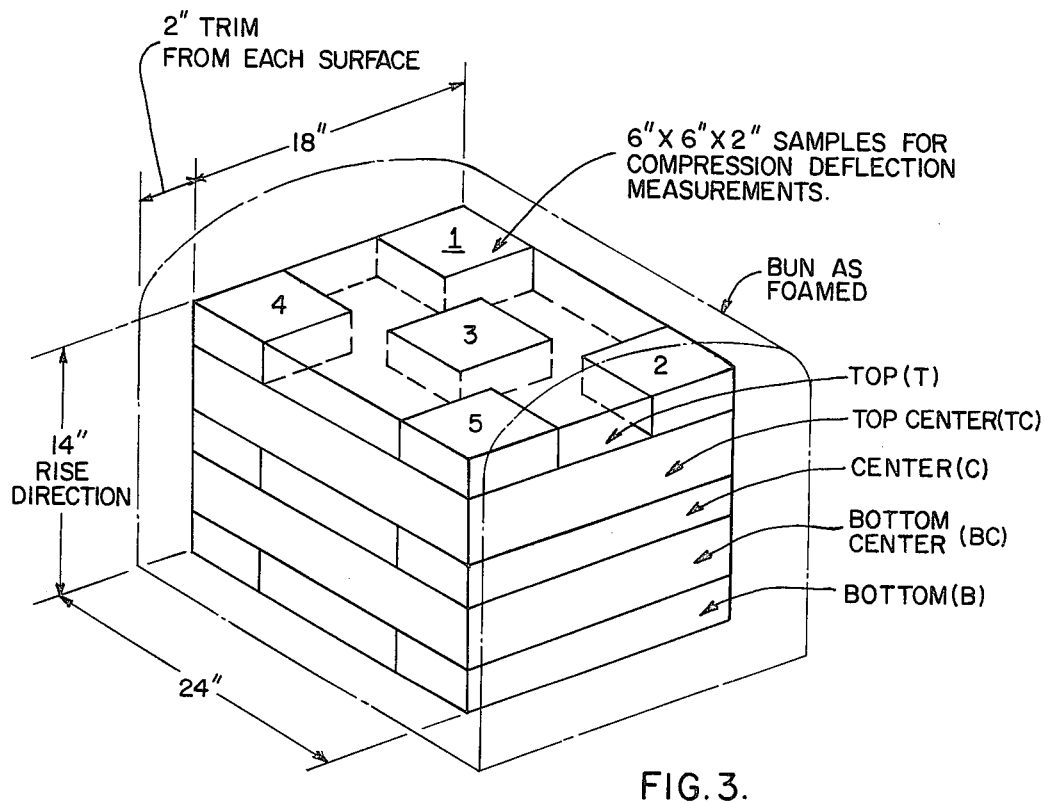
FIG. 3 shows a diagram of the sampling pattern for phenolic foam buns made according to the method of this invention.

The mixing was continued at 1,750 rpm. for an additional 12 seconds for Sample 10; 13 seconds for Samples 1 to 4 and 9; 14 seconds for Sample 8 and 17 seconds for Samples 5 to 7, 11 and 12. Then the stirrer is stopped, the drive assembly raised, the 20 gallon container lowered simultaneously, and within 4 seconds after stirring cessation the mixture was poured into a cardboard mold, supported by a wooden frame to prevent bulging. The mold dimensions were 32" × 26" × 22" high. It is important that the liquid is poured into the mold before the foam creams and that creaming foam is not poured onto rising foam. The foam continued to rise for about 60 seconds at which time the maximum amount of noxious vapors (formaldehyde, acids, etc.) are generated. This provided about 90 pounds of foam. The foamed bun is shown in FIG. 3 of the drawings.

After 3 hours of aging, the mold was stripped from the bun and the skin and sides of the bun were trimmed. After about 2 hours, the trimmed bun was then baked in a vented, forced air circulation oven for about 6 hours at 100° C to remove volatile products remaining in the bun. After baking, the bun was cut to dimensions of 24" × 18" × 14" high and samples were cut, as shown in FIG. 3, for load-deflection and/or breathability testing.

Figure 4:
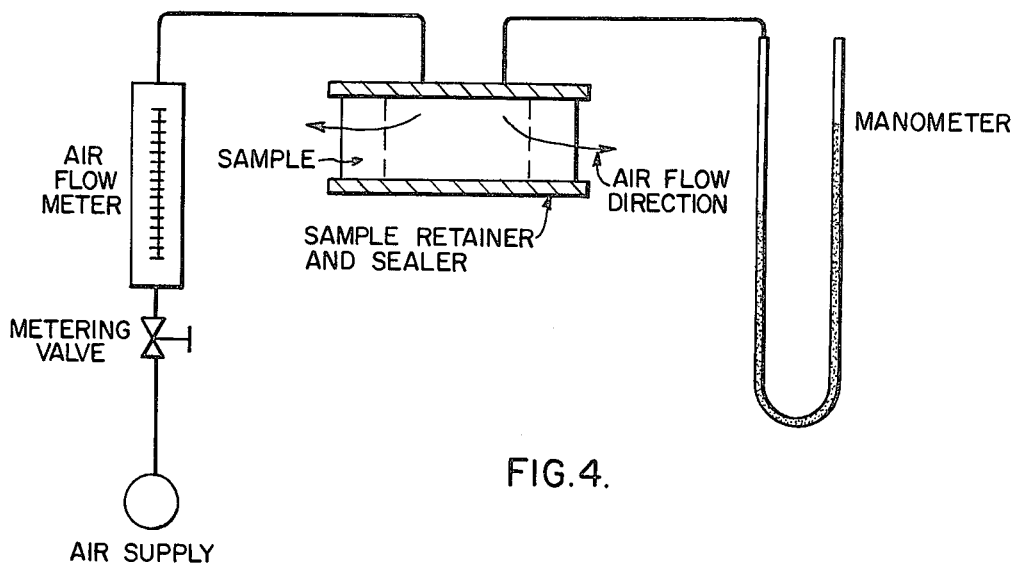
FIG. 4 shows a diagram of the permeability test fixture used in the EXAMPLES.

Compressive strength measurements were then taken at essentially static rates of compression between about 2 in./min. to about 5 in./min. using an Instron Universal Test Machine. Permeability or "breathability" measurements were also taken using the apparatus shown in FIG. 4 of the drawing. Washer shaped specimens having 3.5" inside diameter × 5.5" outside diameter × 2.0" height were cut from 6" × 6" × 2" high blocks with a band saw. After sanding the parallel faces smooth, the washer shaped specimen is placed between two 1/16" thick neoprene gaskets that have been covered with a thick layer of silicone grease. The assembly is inserted into the retainer shown in FIG. 4, which is also coated with silicone grease. Three 6" C clamps are tightened to produce essentially leak-free interfaces. The rate of air flow was adjusted to 16 std. cu. ft./min. and the resultant pressure differential is read directly from a mercury manometer. The result of these tests are given in TABLE 1 above.

As can be seen from the results, the samples tested provided substantially uniform compressive strengths over 40 psi. between 20% to 50% compression at between a 2 in./min. to 5 in./min. rate of deflection. The permeability measurements showed foam samples 1 to 8 to have an open cell structure permitting air to flow freely through their interiors. Samples 9 to 12 showed good insulating properties as well as high compressive strength, making them particularly suitable as roofing and structural building materials. The foam also resisted burning, showing good flame resistant properties.

Several foams were neutralized by being placed in a vacuum chamber having an 18 cu. ft. cavity and evacuated to 6 microns. Ammonia gas was then passed into the chamber at 1 cu. ft./min over 1½ hr. The chamber was vented to a hood and the foams were removed. Five grams of foam was pulverized and slurried in 100 grams of deionized water and the pH measured. Their pH varied from 8 to 9. A pH of about 7 would be the most desired condition and could be easily achieved by using a shorter exposure time. They were found to have good non-corrosive characteristics and the ammonia neutralization did not affect the compressive strength or permeability properties.

EXAMPLE 2

As a comparative example, a second series of foam formulations were made having the compositions set forth in Table 2 in parts by weight:

TABLE 2

| Sample | Reaction Temp. °C | Phenolic Resin High Viscosity | Phenolic Resin Low Viscosity | Span 80 Lipophilic Surfactant | Tween 60 Hydrophilic Surfactant | Blowing Agent | $H_2SO_4$ (42–48%) | $H_3PO_4$ (85%) |
|---|---|---|---|---|---|---|---|---|
| 20 | 18 | 180 | 20 | 0.5 | 0.25 | 15 | 25 | 0 |
| 21 | 18 | 180 | 20 | 0.0 | 0.50 | 12 | 25 | 15 |
| 22 | 18 | 180 | 20 | 1.0 | 0.0 | 12 | 25 | 15 |
| 23 | 18 | 180 | 20 | 0.25 | 0.12 | 12 | 25 | 15 |
| 24 | 18 | 180 | 20 | 0.5 | 0.25 | 12 | 15 | 15 |
| 25 | 18 | 160 | 40 | 0.5 | 0.25 | 12 | 25 | 15 |
| 26 | 18 | 140 | 60 | 0.5 | 0.25 | 12 | 25 | 15 |

| Sample | Compression - Deflection Characteristics Stress lb./sq. in. at % Deflection | | | | Density lb./cu.ft. | Permeability Press Diff. mm. Hg. at 16 std. cu. ft./min. (SCFM) |
|---|---|---|---|---|---|---|
| | 20% | 30% | 40% | 50% | | |
| 20 | 24.6 | 31.5 | 31.1 | 28.1 | 4.9 | 8 |
| 21 | 18.1 | 18.0 | 18.0 | 18.1 | 2.5 | — |
| 22 | collapse | | | | — | — |
| 23 | 39.1 | 38.9 | 38.8 | 37.9 | 4.6 | 28 |
| 24 | 32.7 | 34.3 | 33.6 | 31.5 | 4.9 | 11 |
| 25 | 23.2 | 26.4 | 25.4 | 20.1 | 4.5 | Blow Holes |
| 26 | partial collapse | | | | — | — |

The same ingredients: Bakelite BRL-2760, Bakelite BRL-2759, Span 80, Tween 60, $CClF_2 \cdot CCl_2F$ blowing agent and 47% to 48% $H_2SO_4$: 85% $H_3PO_4$ were used and admixed, using the same mixing procedures as in EXAMPLE 1, the ratio of ingredients however differed as indicated in TABLE 2. After dual acid catalyst solution addition, the mixing was continued at 1,750 rpm. for an additional 17 seconds for all the Samples except rigid, insulating, phenolic foam having a substantially uniform compressive strength of between about 70 psi. to about 150 psi. at between about 20% to about 50% compression, when compressed at a deflection rate of between about 2 in./min. to about 5 in./min.

10. The method of claim 9, wherein up to about 15 parts $H_2O$ is mixed with the ingredients before step (C).

11. A rigid, flame resistant, high compressive strength phenolic foam comprising the reaction product of a mixture of 200 parts by weight of a mixture comprising a high viscosity phenolic resole resin having a viscosity at 25° C of between about 1,550 cps. to about 30,000 cps. and a low viscosity phenolic resole resin having a viscosity at 25° C of between about 100 cps. to about 1,500 cps., wherein the weight ratio of high viscosity phenolic resin:low viscosity phenolic resin is from 1:0 to about 5:1, about 0.5 to about 5 parts by weight of a dual surfactant mixture consisting of a lipophilic surfactant and a hydrophilic surfactant, about 8 parts to about 25 parts by weight of a fluorocarbon blowing agent, and about 20 parts to about 70 parts by weight of a dual acid catalyst solution comprising a sulfuric acid and phosphoric acid solution, wherein the rigid porous, phenolic foam has a substantially uniform compressive strength of at least 40 psi. at between about 20% to about 50% compression, when compressed at a deflection rate of between about 2 in./min. to about 5 in./min.

12. The phenolic foam of claim 11 wherein the weight ratio of high viscosity phenolic resin:low viscosity phenolic resin is from about 20:1 to about 5:1, the weight ratio of lipophilic surfactant:hydrophilic surfactant is from about 10:1 to about 0.6:1, and the weight ratio of sulfuric acid:phosphoric acid is from about 10:1 to about 0.8:1.

13. The phenolic foam of claim 12 attached to the closure shell of a missile launch tube.

* * * * *